May 28, 1968
J. H. HARSHBARGER
3,385,930
ELECTRONIC SOUND DETECTOR
Filed March 8, 1965
4 Sheets-Sheet 1
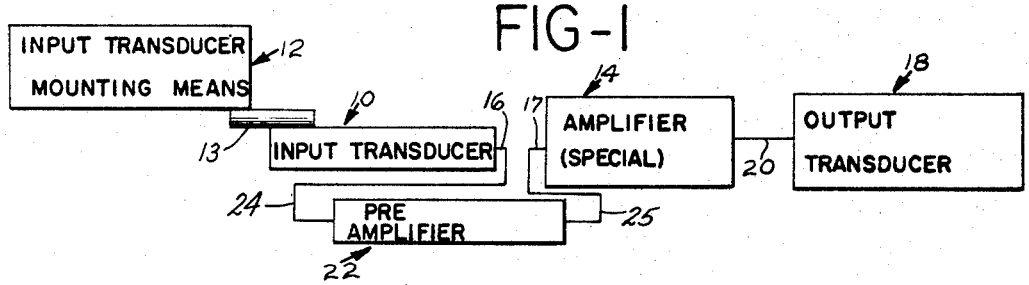
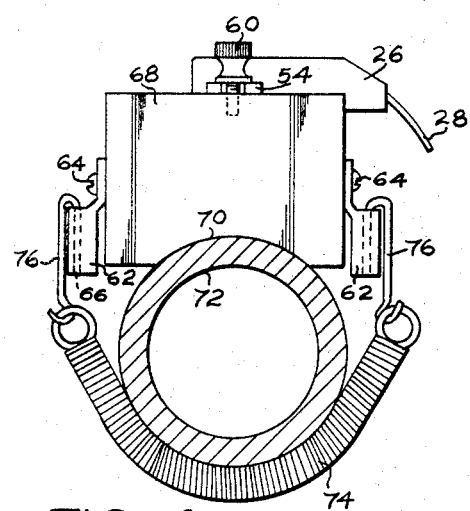
FIG-4
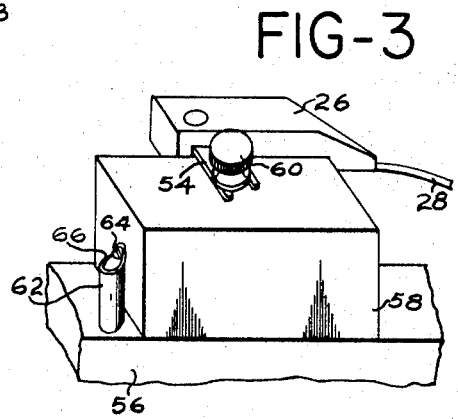
FIG-3
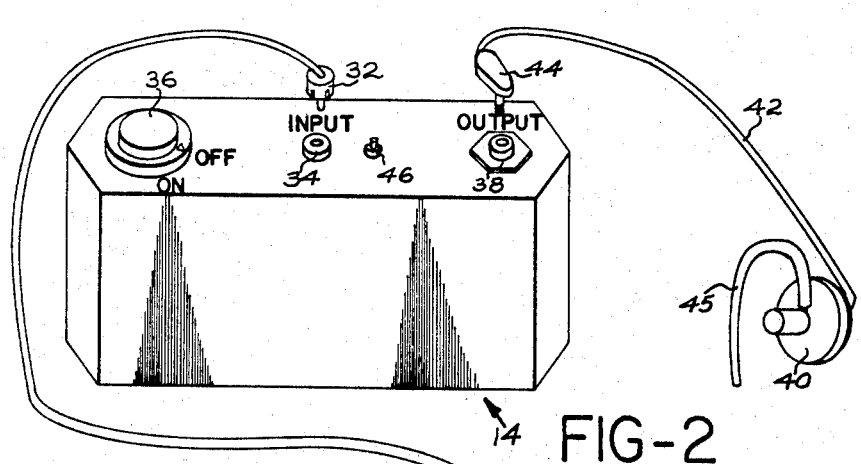
FIG-2
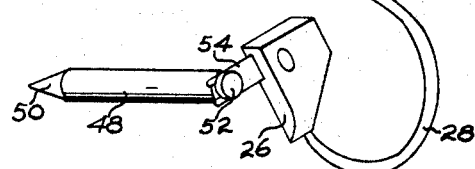
INVENTOR.
JOHN H. HARSHBARGER
BY Toulmin & Toulmin
ATTORNEYS May 28, 1968  J. H. HARSHBARGER  3,385,930
ELECTRONIC SOUND DETECTOR
Filed March 8, 1965  4 Sheets-Sheet 2

INVENTOR.
JOHN H. HARSHBARGER
BY Toulmin & Toulmin
ATTORNEYS

INVENTOR.
JOHN H. HARSHBARGER
BY Toulmin & Toulmin
ATTORNEYS

United States Patent Office 3,385,930
Patented May 28, 1968

3,385,930
ELECTRONIC SOUND DETECTOR
John H. Harshbarger, Xenia, Ohio, assignor to Visual Information Institute, Inc., Xenia, Ohio, a corporation of Ohio
Filed Mar. 8, 1965, Ser. No. 437,970
8 Claims. (Cl. 179—1)

ABSTRACT OF THE DISCLOSURE

Vibrations are transmitted to a crystal microphone through any of numerous, special-purpose, detachable probes. A pocket sized amplifier connects to the microphone and drives an earphone.

---

This invention relates to a sound detection system, and more particularly it relates to a sound detection system which is compact, portable and especially adaptable for detecting vibrations in a variety of different subjects.

In recent years there has been an increased interest in the study of vibrations in machinery and equipment in industry with an eye towards developing preventive maintenance systems relating to eliminating the wear on the equipment due to unwanted vibrations. Part of the difficulty in advanceing these studies lies in the fact that there are no available sound detection systems which are adaptable for determining vibrations in a variety of different subjects.

Applicant's invention is especially suitable for such work. The sound detection system of this invention generally comprises an input transducer which may be a microphone. The input transducer converts the vibrations to electrical signals which are then fed into a special amplifier means. The amplified signal is then fed into an output transducer which may be an earphone, loudspeaker and the like. Part of the versatility of applicant's invention is due to a plurality of mounting means which are provided for adapting the input transducer to specific subjects whose vibrations are to be detected. Also included in this invention is a pre-amplifier means which is operated in conjunction with the input transducer in certain applications, as for example, in an electronic stethoscope.

The invention as disclosed herein is believed to have many novel and unique features as set forth below.

It will be used in many applications now employing a stethoscope, therefore it can be considered an electronic version of the conventional, acoustical stethoscope, and will replace this older instrument in many instances.

It offers many operational advantages over the conventional stethoscope. The bulk of the system is included in the pocket-sized amplifier, which will be carried in the pocket or attached to a belt. Therefore only the light weight output transducer hangs from the operator's ear, providing a more comfortable operating situation which will not result in eventual enlargement of the ear cartilage.

The various parts of the system, input transducer, amplifier, and output transducer, are interconnected by electrical wiring. The connecting wires are quite flexible, permitting convenient and ready placement of various parts of the system. The length of wires is not critical, permitting remote location of the input transducer and/or amplifier if desired. This is not possible with a conventional stethoscope due to the critical length requirements of acoustical tubing.

The interconnecting wires of the system do not have acoustical properties, permitting a more flexible operating arrangement. The acoustical tubing of the conventional stethoscope must be carefully located to prevent extraneous acoustical pick-up from the tubing rubbing against an object.

All major parts of the system are designed with quick disconnect features. Therefore, various options may be selected and used interchangeably with great rapidity. This is especially important in permitting rapid selection of the particular pick-up probe required for a specific task.

The system operates from a self-contained battery power source, making it portable for field use without requiring an external source of electrical power.

The transistorized circuitry included in the unit contains optional shunt capacitive filtering for tailored limitation of high frequency response, thus the spectrum of sound studied is selectable by value of these components.

An object of this invention is to provide a sound detection system which incorporates the features listed above.

A further object of this invention is to provide a sound detection system which is economical to produce, portable, and readily adapted for detecting vibrations in different subjects.

Another object of this invention is to provide special amplifier means especially suited for use in the sound detection system.

These objects, advantages and features will be more fully explained in the following description and drawings, in which:

FIGURE 1 is a block diagram showing the essential elements of this invention;

FIGURE 2 is a general perspective view showing one embodiment of this invention;

FIGURE 3 is a general perspective view showing another embodiment of the mounting means used for connecting the input transducer to the subject whose vibrations are to be detected;

FIGURE 4 shows another modification of the mounting means of this invention;

Figure 5:
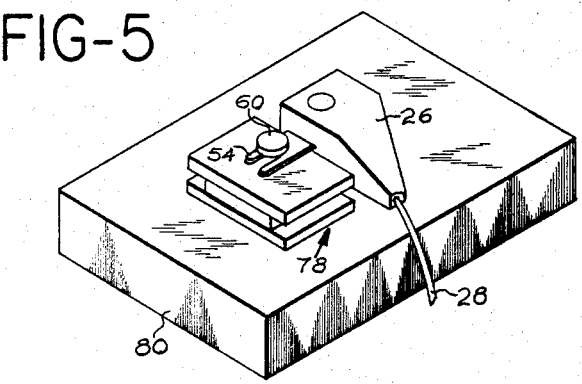
FIGURE 5 is a perspective view in which the mounting means are magnetic.

Referring to the drawings in more detail, FIGURE 1 is a block diagram showing the different elements of this invention. The elements include an input transducer 10 having an output terminal 16 which may be directly connected to the input terminal 17 of amplifier 14. The input transducer 10 may be of the microphone type which may be a conventional sound microphone or a crystal contact microphone. After the vibrations are converted to electrical signals in the input transducer they are amplified in amplifier 14 and are then routed to the output transducer 18 via electrical conduit 20. The output transducer may be conventional earphones or loudspeakers, or may also be earphones which are especially adapted for insertion in the human ear.

Also forming part of this invention is the pre-amplifier means 22 which may be operatively interposed between the input transducer 10 and amplifier 14 by electrical conductors 24 and 25. The sound detection system of this invention provides a great deal of versatility through the input transducer mounting means 12, which is shown as connected to transducer 10 by a vibration conducting means 13. The mounting means 12 may take a variety of forms, as will be later described in the subsequent figures.

FIGURE 2 shows one embodiment of this invention in which the input transducer takes the form of a microphone 26. The microphone converts vibrational energy into electrical signals which are conveyed via flexible electrical conduit 28 to the amplifier means generally designated 14, which is housed in an amplifier cabinet 30. The cabinet 30 is extremely compact and is of a size which will fit in a shirt pocket. The end of conductor 28 has a known jack 32 on the end thereof which fits into a receptacle 34 which is operatively connected to the amplifier 14, as will be later described.

A suitable output receptacle 38 is provided on the cabinet 30 to provide a detachable means for connecting the amplifier with the output transducer which may be a specialized earphone 40 as shown in FIGURE 2. The earphone 40 has a flexible lead 42 which has a known type male jack 44 on the end thereof to provide the detachable connection to the amplifier output 38. The earphone 40 has a bracket 45 which enables the earphone to be held on a human ear. The cabinet 30 is provided with an "off-on" switch 36 which also incorporates a volume control therein, and which also is provided with a single pole throw switch 46 which is used to select system sensitivity and to minimize the amplification of signals from the microphone 26 while the microphone is being positioned on the subject whose vibrations are to be detected. The microphone 26 as shown in this embodiment may be of the contact crystal microphone type having an input element 54.

The particular input transducer mounting means in this modification consists of a probe type member 48 which is made of a known sound conducting material. The probe 48 has a pointed end 50 for probing the subject whose vibrational energy is to be detected, and also has a thumb screw 52 on the remaining end thereof. The thumb screw 52 is used to detachably connect the input element 54 of the microphone thereto. By this construction, it is easily seen that the various elements of this invention are compact, portable and readily detachable to provide a great deal of versatility in using the system.

FIGURE 3 shows another modification of the mounting means which may take the form of a block member 58 which is positioned on the subject 56. The top of the block member has an aperture therein which is threaded to receive the thumb screw 60, which is used to secure the input element 54 to the mounting means. To provide additional versatility for the block member 58 there are fastener elements 62 positioned on opposite sides of the block member and are secured thereto by fasteners 64. The fastener member 62 has an aperture 66 which is used to receive a hook member in another modification which will be subsequently discussed.

In FIGURE 3 the bottom of the block member 58 which is resting on subject 56 may be flat so that the two contacting surfaces engage each other over the entire area to provide a good sound transmitting connection. The bottom of the block member 58 may also have curved portions to adapt the member to different subjects. For example, one such modification is shown in FIGURE 4. Here the block member 68 has an arcuately shaped recess 70 formed in the bottom thereof which is complementary to the conduit 72, which may be a pipe, for example. This modification is especially useful for listening to the flow of fluids in a pipe. The block member 68 has fastener elements 62 mounted on opposed faces as previously explained. The block member 68 is retained on pipe 72 through the use of a coil spring 74 which has hook elements 76 secured to the ends thereof as shown. These hook elements 76 are inserted in apertures 66 of the fastener element 62 as shown. In this manner, there is provided a good sound transfer between pipe 72 and block member 68 which is then transferred via input element 54 to the microphone 26. Lead 28 delivers the output of the microphone to the amplifier generally designated 14.

FIGURE 5 shows another modification of the mounting means which are used to secure the microphone 26 to the subject 80. In this instance, the mounting means generally designated 78 consists of a conventional permanent magnet which is suitably apertured and threaded to receive the thumb screw 60. Thumb screw 60 is used to detachably secure input element 54 to the magnet 78.

Figure 6:
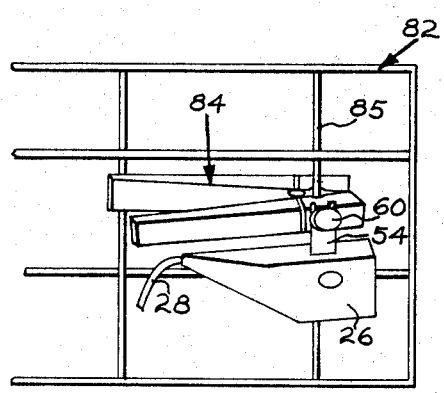
FIGURE 6 is a general perspective view of another embodiment of the mounting means in clip form.

FIGURE 6 shows another modification of the mounting means for the input transducer which is especially adaptable for mounting on rod-like elements such as those found in a grill 82. The mounting means may take the form of a pinch-clip generally designated 84. The input element 54 of the input transducer is secured to the clip by a fastener 60 near the area where the jaws of the clip come in contact with the rod element 85 of the grill 82. A suitable nut (not shown) is on the other side of fastener 60 and provides good vibrational contact between the rod element 85 and the input element 54.

This invention is also adaptable for use by the medical profession especially for use with stethoscopes. For certain subjects which are soft and resilient, it is necessary to develop different input transducers to pick up the vibrational energy therefrom.

Figure 7:
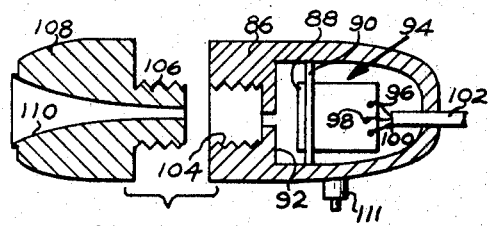
FIGURE 7 shows another embodiment of the input transducer which is especially adaptable for picking up vibrations from a soft resilient body.

FIGURE 7 shows one such modification. The input transducer in this modification consists of a tubular type housing 86 which is shown in cross section. The input element 88 for the pick-up microphone is suitably mounted on member 90 which is located inside the housing 86. In front of the input element 88 there is an input chamber 92 in which the input element 88 vibrates. When using the input transducer means for soft and resilient subjects, it is sometimes preferred to incorporate a pre-amplifier in the pick-up means. The pre-amplifier generally designated 94 may be a small transistorized amplifier which will be discussed in detail later.

The output from the pre-amplifier comprising leads 96, 98 and 100 are routed via electrical conduit 102 to the amplifier 14. The front portion of the housing 86 is internally threaded at 104 to receive the mating threads 106 of an end member 108. The end member 108 has a bell-shaped chamber 110 therein which is made according to known techniques in the industry and provides for delivering the vibrational energy or sound to the input element 88 when the end member 108 is threaded on to the housing 86. The input transducer may also be provided with a switch member 111 located on the housing 86 which is effective for preventing amplification until the transducer is positioned on the subject. In this respect, a lot of unnecessary contact noises are eliminated.

Figure 8:
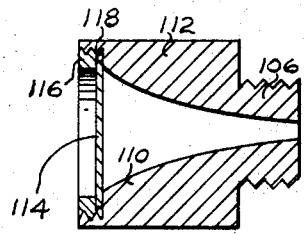
FIGURE 8 shows a cross section of an end member which may be used in conjunction with the modification shown in FIGURE 7.

FIGURE 8 shows a modification of the end member shown in FIGURE 7. The end member 112 is threaded at 106 to be inserted in the housing 86 of FIGURE 7. The end member 112 has a diaphragm member 114 which may be made of plastic and is inserted in a recess in member 112 at the mouth of the bell-shaped chamber 110. The diaphragm 114 is suitably retained in position by a threaded ring 116 which is threaded into threads 118 on member 112. The diaphragm 114 is then brought into contact with a soft resilient member and is especially useful for concentrating the sound energy and for delivering it to the pick-up element 88 in the transducer housing 86 as shown in FIGURE 7. The input element 88 shown in FIGURE 7 is part of an ultra-miniature sound microphone.

It should be noted that there is a great deal of flexibility in the mounting means for connecting the input transducer to the subject whose vibrational energy is to be detected.

These means are especially versatile as seen by the different embodiments shown in FIGURES 2 through 8. Additional versatility is obtained through using pre-amplifiers in connection with the input transducer as mentioned in regard to FIGURE 7 in which the pre-amplifier means is shown schematically as 94. The pre-amplifier means according to this invention may be constructed as shown in the schematic diagram of FIGURES 9 or 10. The function of the pre-amplifiers in each of these two units is identical, and either may incorporate additional stages of amplification if required.

Figure 9:
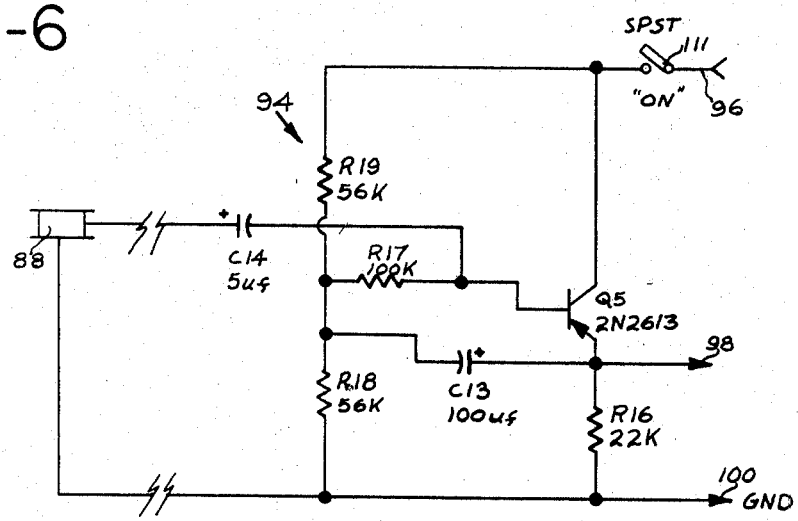
FIGURE 9 is a schematic view of one of the pre-amplifier circuits of this invention.

The schematic diagram of FIGURE 9 sets forth circuitry composed of one stage of transistorized amplifiers. It is a high input impedance stage of the Darlington configuration, so called because of the emitter-to-base feedback via C13 to develop the high impedance of 1 megohm exhibited by this device. The output impedance is 10,000 ohms, sending signals at a level compatible with the amplifier input and of sufficiently low impedance that extraneous and undesired interference will not be picked up on wiring from the input transducer to the amplifier. The specific values for an embodiment of the amplifier are shown on the drawings.

Figure 10:
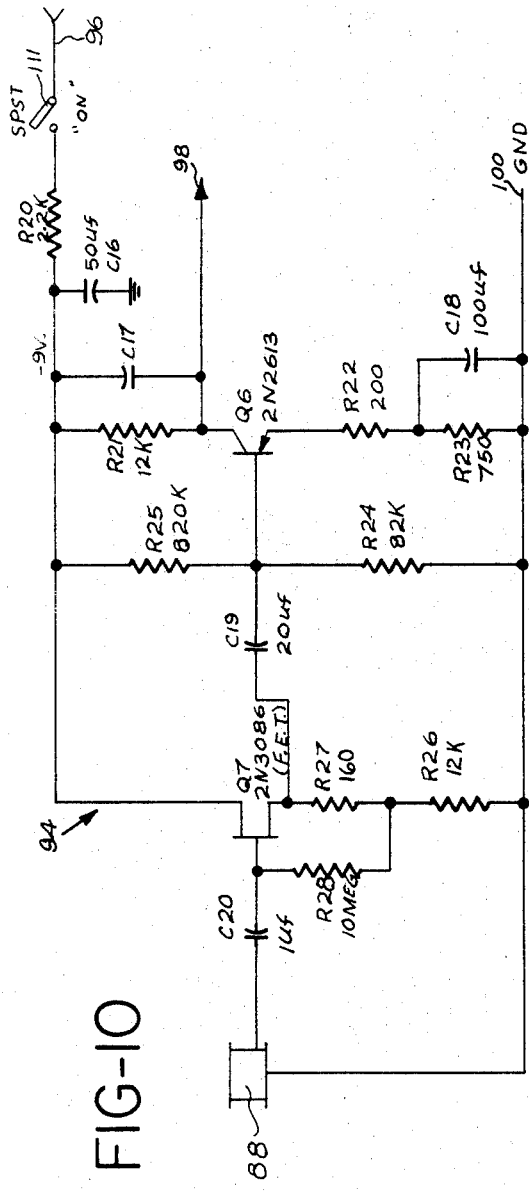
FIGURE 10 is a schematic view of another modification of the pre-amplifier circuit of this invention.

The schematic of FIGURE 10 describes a more elaborate pre-amplifier to provide a very high input impedance, improved signal-to-noise ratio, and adequate signal gain. It is to be employed particularly in versions of this device that are constructed to process only low frequency sounds. The input stage Q7, employs a field effect transistor connected in a source-follower configuration, thereby achieving very high input impedance, fairly low output impedance from this stage, and a signal gain less than one. The circuit using component values shown exhibits an input impedance of 100 megohms, selected expressly to preserve the low frequency output from a crystal microphone used as to the sound-to-electrical signal conversion device in this case.

The second stage, Q6, is designed with an input impedance to match the output of Q5, established by selected value of the unbypassed emitted resistor, R26. This stage also provides signal gain as permitted after design requirements are met by establishing the input impedance and by selecting the value of collector resistance R21, to provide a 10,000 ohm output impedance level for signal transmission to the amplifier. Note that additional stages of amplification may be used after Q6 to meet these design objectives if it cannot be accomplished in these two stages alone with the components selected due to economic and availability factors. The resistor and capacitor combination, R20 and C16, constitute a decoupling circuit for the power input from the amplifier, inserted to prevent low frequency oscillation of the signal processing circuitry when connected and operating.

Attention is called to one unique feature of the signal amplification circuitry in this unit, that of capacitor C17 shown as an optional filter across the collector load resistor, R21. Whereas, most amplifiers strive to preserve high frequency response, this unit is designed to preserve low frequency response, by use of large value coupling capacitors, C19 and C20, and have a controlled cut-off of high frequency signals by use of the shunt capacitor C17. Therefore, interference, overtones, and extraneous noise introduced in the pick-up can be eliminated, permitting monitoring, study and analysis of the exact sound spectrum of interest. This is required especially in stethoscope studies on the human body. The specific values of an embodiment are shown in the drawing.

The schematics of FIGURES 9 and 10 both show a switch, 111 at the power input wire. This is an optional push-button switch, single pole, single throw, that provides an optional "push-to-operate" capability on the input transducer. This is employed specifically to permit placement of the pick-up probe without amplification of the sounds resulting from probe contact. The switch is pushed to hear sounds only when desired in the course of investigation.

The pre-amplifiers described above do not contain their own power source, but are wired to draw power from the source contained in the amplifier with which they will be used. When pre-amplifiers are used, the power may be conveyed over a three-wire cable 102. The jack 32 and receptacle 34 may be changed to three-contact elements to accommodate the extra conductor.

Figure 11:
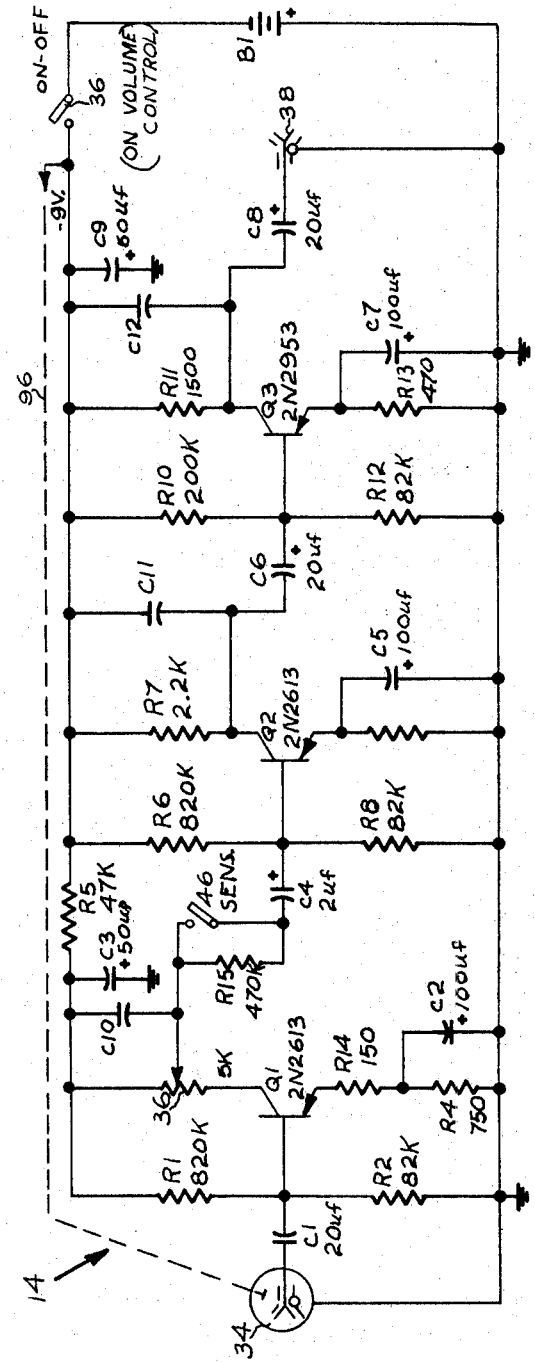
FIGURE 11 is a schematic view of the amplifier circuit of this invention.

FIGURE 11 shows the amplifier 14 which is especially designed for amplifying signals from the input transducer to a level sufficient for transmission to the output transducer, for providing an output impedance compatible with that of the output transducer, and to insert high frequency signal filtering in a controlled manner to provide an output in the signal spectrum desired to carry out investigation and studies as desired. The basic version of the amplifier is shown in the schematic of FIGURE 11. It is composed of three transistorized amplifier stages, each of the common emitter configuration.

The first stage is designed to present an input impedance of 10,000 ohms, due to unbypassed emitter resistor R14. The input lead contains a coupling capacitor C1 to provide D.C. isolation from the input transducer. The second stage is a conventional low level amplifier. The third stage is designed specifically to drive the output transducer, and therefore exhibits a selected output impedance to match this transducer as established by transistor bias and the value of collector load resistance. Additional stages may be employed if required to properly drive various types of output transducers.

The unit as shown in the figure is battery powered, employing a miniature mercury battery B1, or if desired, a rechargeable power pack. When a rechargeable power source is used, a plug will be provided on the case bottom so that recharging can be accomplished without disassembly of the unit (not shown).

A unique feature of this amplifier is the inclusion of capacitors C10, C11 and C12 as shunt filters across each collector load. These components permit complete selection of amplifier high frequency response. In the normal amplifier without such filtering, the high frequency response extends well above the range of human hearing. However, in this case, such response is not required as the human ear is the point of utilization for the amplifier output. In fact, permitting this high frequency response may degrade the signal due to internal oscillation, overtone, and harmonic development, and the amplification of interference signals to a level which may cause false distortion and nonlinear compression of the desired signal. Therefore, these components constitute an essential part of this device, limiting the signal spectrum to the exact upper limit required by the application. The exact values are to be selected for the specific use envisioned, for instance, selection of C10, C11 and C12 as 5 microfarad limits response to no higher than 100 c.p.s. information. Response limitation in this range is required for effective stethoscope examination of the human body. Suitable switch means as shown in FIGURE 12 may be used to add versatility to the system as will be later described.

The inclusion of coupling capacitors C1, C4, C6 and C8 serve the dual purpose of providing D.C. isolation between stages in the conventional manner, plus controlling the amplifier low frequency response. The relatively large values shown in the schematic provide a full signal response to the order of 10 cycles. The incorporation of response to quite low frequencies is essential to apply this instrument successfully.

The complete amplifier, including circuitry as shown, internal battery for power supply, input and output jacks, and switchable attenuator-sensitivity range (R15 and 46) are encased in a small housing or cabinet 30 for convenient pocket use. The assembly is small enough and light enough to carry in a shirt or jacket pocket.

Figure 12:
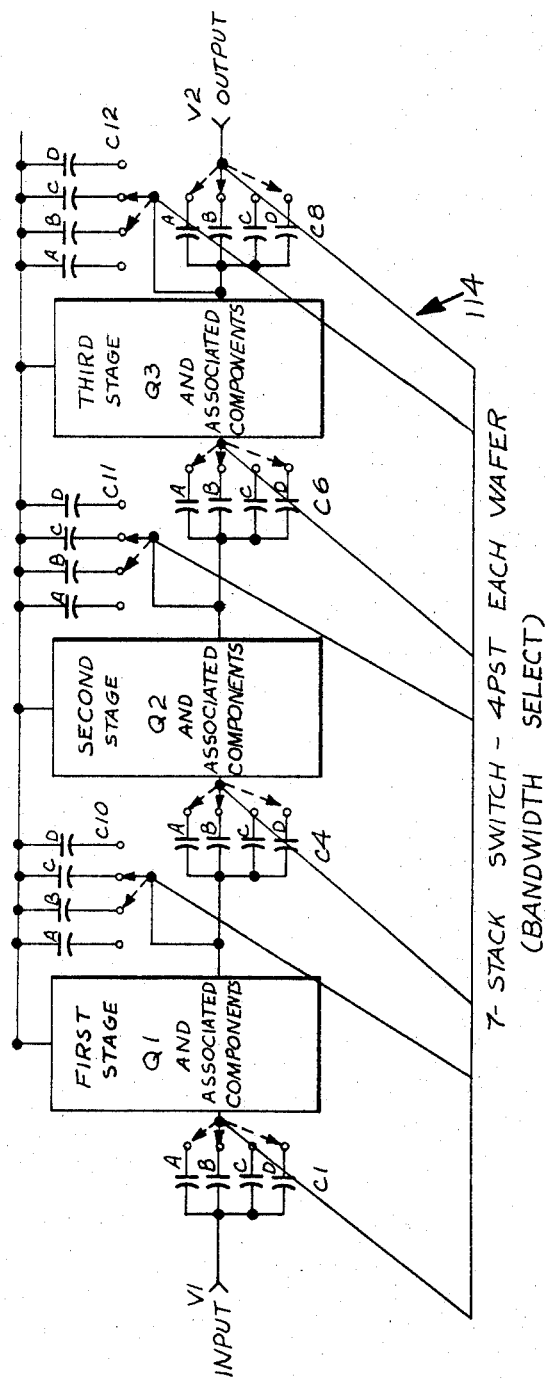
FIGURE 12 shows a schematic diagram of a modification of the amplifier shown in FIGURE 11.

FIGURE 12 shows a modified form of the amplifier shown in FIGURE 11; however, in this modification, suitable switch means, generally designated 114, have been incorporated in the amplifier circuit to select the particular capacitor value to obtain the desired frequency response from the amplifier.

The switch 114 is a standard 7 stack, 4 pole single throw switch with seven electrically independent but mechanically connected sections which are used to select the various capacitors desired. The capacitors generally designated $C_1$, $C_4$, $C_6$, $C_8$, $C_{10}$, $C_{11}$ and $C_{12}$ are each wired to a separate stack of the switch with four individual switch positions A–D being provided. It is, of course, understood that there may be more or less switch positions depending upon the desired response characteristic. Suitable individual capacitors may be wired to the various switch positions for each stack of switch as shown. The specific values of the capacitors are selected according to the principles previously explained. In order to simplify the schematic, the various stages $Q_1$, $Q_2$ and $Q_3$ and their associated components are merely shown block form.

It may also be desirable to use two switches in order that high and low frequency response may be selected independently of each other. In this respect, a known three section switch (not shown) may be used to select the values for capacitors $C_{10}$, $C_{11}$ and $C_{12}$ as previously explained in connection with the seven stack switch 114 while a four section switch (not shown) may be used to select values of capacitors $C_1$, $C_4$, $C_6$ and $C_8$. Typical switches to be used would be similar to phenolic or ceramic wafer switches.

The output transducer 18 is a device to convert the electrical signals out of the amplifier to audible sound. A variety of forms may be used with the system, including either a small earpiece similar to that used with transistor radios, a set of headphones, or a common loudspeaker.

It is known that a special type of of output transducer will be required for certain applications. Stethoscopic studies of the human body involve sounds below 100 cycles per second. The conventional earphones and speakers have response to much higher frequencies, and in fact, are not efficient sound generators at the low frequencies. Therefore special output transducers with peak response at frequencies less than 100 c.p.s. will be employed for specific uses.

The system in its various forms will have wide and universal application. It can be used to detect sound within any conceivable container. It will be especially useful in the following:

To check the condition of bearings in rotating machinery.

To check the internal workings of internal combustion engines, including valve operation, ignition breaker point operation, cam shaft operation, water pump operation, lubricating and cooling fluid flow.

To check for the presence of fluid flow inside tubing and pipes, as a leak detector or pipeline locator.

To detect sounds through walls.

To detect sounds interior to the human body or body of animals, as in medical and veterinary practices.

To detect magnetic fields, as in detecting and amplifying a telephone conversation.

To check for squeaks and rattles in a mechanical assembly, as in automobile bodies and ships, as well as air frames.

To check the internal workings of precise mechanism, as in clocks and watches, combination locks and detonators.

To check underground sounds, as in well drilling and seismology.

Some general comments about the various elements of this invention are in order.

The mounting means may take several forms as seen by the different embodiments. Most of the embodiments deal with direct transfer of sound; however, others deal with picking up sounds from soft or resilient bodies.

The modification shown in FIGURES 7 and 8 have been developed to pick up sounds from bodies or objects which have a soft or resilient surface. Direct conduction of sound is not as effective in these cases. As shown in FIGURES 7 and 8, some applications require a bell-shaped chamber. The base of the bell is placed against the surface of interest. The internal passage of this structure is bell or cone-shaped to gather, condense, and transmit the sound; the size of the passage is designed to effectively transmit the sound spectrum of interest, according to accepted accoustical principles. The rear portion of this probe or end member is threaded to act as a holder for the input transducer.

The sensitivity of this configuration may be improved by placing a thin membrane over the bottom of the cone-shaped passage. Thus a relatively large surface area of membrane will be in close contact with the resilient surface of the object under test, providing a greater sound output into the probe passage, as illustrated in FIGURE 8. The modification is especially useful when the sound detection system is used as a stethoscope.

Additional flexibility may be provided in the sound detection system by providing a second output jack (not shown) on the amplifier cabinet. This output jack could be wired directly to input jack 34 so that the input could be picked up from the second output jack by convenient leads and then fed into a test instrument such as a voltmeter. In this manner the input transducer 26 may be utilized with the various mounting means to obtain electrical signals which can be conveniently measured in auxiliary test instruments.

The power gain of the amplifier shown in FIGURE 11 without the pre-amplifiers and with the attenuation resistor R15 out of the circuit is as follows:

$$\text{Power Gain} = \frac{3.33 \times 10^{-3}}{10^{-12}} = 3.33 \times 10^9 = 95 \text{ db}$$

As was stated previously, the capacitors C10, C11 and C12 act as shunt filters across the collector loads for $Q_1$, $Q_2$ and $Q_3$ respectively as shown in FIGURE 11. These capacitors permit the selection of amplifier frequency response. With 1000 $\mu\mu$f. capacitors for C10 and C11, and with a 2200 $\mu\mu$f. capacitor for C12, the amplifier gave the following gain of 6 db at 30 kc. and 3 db down at 20 kc.

The amplifier gain was measured under actual operating conditions with the output transducer being attached to the amplifier. The gain so measured was 20,000 at 1000 c.p.s.

It will be understood that this invention is susceptible to modification in order to adapt it to different usages and conditions; and accordingly, it is desired to comprehend such modifications within this invention as may fall within the scope of the appended claims.

What is claimed is:

1. A sound detection system comprising: an amplifier, a pocket size housing containing said amplifier, an output transducer, first means including electrical connectors leading from said output transducer to said housing and connecting said output transducer to the output side of said amplifier, an input transducer, second means including electrical connectors leading from said input transducer to said housing and connecting said input transducer to the input side of said amplifier, said input transducer comprising a crystal type microphone having a relatively flat substantially rigid blade-like bifurcated input member projecting therefrom, a probe element detachably connected to said input member in vibration transmitting relation thereto and adapted to transmit vibrations from a subject to said input member.

2. A sound detection system according to claim 1, in which said output transducer is an earphone.

3. A sound detection system according to claim 1, in which said probe element is a substantially rigid rod-like member adapted to contact a subject at one end and having means at the other end for vibration transmitting detachable connection of the probe element to said input member.

4. A sound detection system according to claim 1, in which said probe element is a substantially rigid block, a spring member, said block having means thereon for detachably securing said spring member to opposed sides of said block with the spring member in encircling relation to a subject for thereby detachably securing said block to said subject, and means on the block which is exposed when the block is secured to a subject for detachably connecting said block to said input member in vibration transmitting relation thereto.

5. A sound detection system according to claim 1 in which said probe element comprises a permanent magnet adapted to hold itself on a magnetic subject and comprising means for vibration transmitting detachable connection to said input member.

6. A sound detection system according to claim 1 in which said probe element comprises a pair of jaw members spring urged toward each other so as to be able to grip a subject therebetween, one of said jaw members comprising means for vibration transmitting detachable connection thereof to said input member.

7. A sound detection system according to claim 1 in which said amplifier is in the form of a transistorized multiple stage battery powered amplifier, coupling capacitor means connecting adjacent stages of the amplifier to provide for D.C. isolation of the stages from each other and to regulate the low frequency response of the system, and shunt capacitor means at the output side of each amplifier stage to regulate the high frequency response of the system.

8. A sound detection system according to claim 7, in which at least one of said coupling and shunt capacitor means is in the form of a plurality of parallel connected capacitors for each amplifier stage, and plural position switch means operable for making a different one of said plurality of capacitors for each stage effective in each position of the switch.

References Cited

UNITED STATES PATENTS

| | | | |
|---|---|---|---|
| 3,254,528 | 6/1966 | Micheal | 73—71.4 |
| 3,182,129 | 5/1965 | Clark et al. | 179—1 |
| 3,095,532 | 6/1963 | Floyd | 73—70 XR |
| 2,892,034 | 6/1959 | Fielding | 179—1 |
| 2,755,336 | 7/1956 | Zener et al. | 179—1 |

FOREIGN PATENTS

| | | |
|---|---|---|
| 871,595 | 6/1961 | England. |

WILLIAM C. COOPER, *Primary Examiner.*

KATHLEEN H. CLAFFY, *Examiner.*

R. P. TAYLOR, *Assistant Examiner.*